United States Patent
Yanagida et al.

(10) Patent No.: US 8,649,948 B2
(45) Date of Patent: Feb. 11, 2014

(54) VEHICLE HILL START ASSIST SYSTEM

(75) Inventors: Hisanori Yanagida, Saitama (JP); Shoji Ichikawa, Saitama (JP); Ryoji Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 13/500,151

(22) PCT Filed: Oct. 7, 2010

(86) PCT No.: PCT/JP2010/006010
§ 371 (c)(1),
(2), (4) Date: Apr. 4, 2012

(87) PCT Pub. No.: WO2011/043078
PCT Pub. Date: Apr. 14, 2011

(65) Prior Publication Data
US 2012/0209479 A1    Aug. 16, 2012

(30) Foreign Application Priority Data

Oct. 7, 2009   (JP) ................................. 2009-233497

(51) Int. Cl.
*G06F 7/70*    (2006.01)
*G06F 7/00*    (2006.01)

(52) U.S. Cl.
USPC .............................................. 701/51; 701/70

(58) Field of Classification Search
USPC .................... 318/565; 340/3.1, 505, 518, 525; 700/79, 82; 701/51, 70
See application file for complete search history.

(56) References Cited

U.S. PATENT DOCUMENTS

| | | | |
|---|---|---|---|
| 6,009,984 A | 1/2000 | Zechmann et al. | |
| 6,346,064 B1 | 2/2002 | Hada et al. | |
| 6,547,344 B2 | 4/2003 | Hada et al. | |
| 6,997,289 B2 | 2/2006 | Iwagawa et al. | |
| 2002/0029943 A1 | 3/2002 | Totsuka et al. | |
| 2009/0062068 A1* | 3/2009 | Nakai et al. ...................... | 477/92 |

(Continued)

FOREIGN PATENT DOCUMENTS

| | | |
|---|---|---|
| JP | 7-040812 A | 2/1995 |
| JP | 7-144623 A | 6/1995 |

(Continued)

*Primary Examiner* — Ian Jen
(74) *Attorney, Agent, or Firm* — Carrier Blackman & Associates, P.C.; Joseph P. Carrier; William D. Blackman

(57) ABSTRACT

Disclosed is a hill start assist for a vehicle capable of suppressing vehicle movement contrary to driver's expectations and capable of improving driving feel even if the magnitude of detected values regarding the driving direction of driving wheels or that of driving force of the driving wheels are abnormal. Specifically disclosed is a hill start assist (1) for a vehicle comprising an ECU (20) that includes a detection state determining unit (25) that determines the detection state of a shift lever position switch (14) and a retention control unit (26) that performs retention control in which a reduction in braking force of a braking device (5) is suppressed when the operation of a brake pedal (2) is stopped. The retention control unit (26) further includes a first retention control performing unit (27) selected when determination results of the detection state determining unit (25) are normal and a second retention control performing unit (29) selected when the determination results of the detection state determining unit (25) are abnormal. The second retention control performing unit (29) performs the retention control in a manner such that the vehicle is retained in a stop state for a second stop retention time (T2) shorter than a first stop retention time (T1) set by the first retention control performing unit (27).

9 Claims, 12 Drawing Sheets

(56) References Cited

U.S. PATENT DOCUMENTS

| | | | |
|---|---|---|---|
| 2009/0187324 A1* | 7/2009 | Lu et al. | 701/94 |
| 2009/0192019 A1* | 7/2009 | Groner et al. | 477/195 |

FOREIGN PATENT DOCUMENTS

| | | |
|---|---|---|
| JP | 8-198073 A | 8/1996 |
| JP | 10-044950 A | 2/1998 |
| JP | 2001-047893 A | 2/2001 |
| JP | 2001-354126 A | 12/2001 |
| JP | 2002-087231 A | 3/2002 |
| JP | 2003-327101 A | 11/2003 |
| JP | 2003-327102 A | 11/2003 |
| JP | 2007-326516 A | 12/2007 |
| JP | 2008-128103 A | 6/2008 |

* cited by examiner

Fig.3

| detected state | detected signal | hill start assist system | | |
|---|---|---|---|---|
| | | maintaining control execution unit | position determi-nation | operation |
| normal | P | first | P | not activated |
| | R | | R | activated on downhill |
| | N | | N | not activated |
| | D | | D | activated on uphil |
| abnormal — double detection | P, R | second | no determi-nation | activated on incline |
| | P, N | | | |
| | P, D | | | |
| | R, N | | | |
| | R, D | | | |
| | N, D | | | |
| abnormal — no detection | — | | | |

*Fig.9*

| shift lever position | shift indicator | road | |
|---|---|---|---|
| | | uphill | downhill |
| P range | P | not activated | not activated |
| R range | R | not activated | activated |
| N range | N | not activated | not activated |
| D range | D | activated | not activated |

*Fig.10*

AT vehicle

| detected state | detected signal | HSA determination | actual lever position | problems |
|---|---|---|---|---|
| double detection | P, R | P | P | |
| | | | R | rolling forward in rearward start on downhill |
| | P, N | P | P | |
| | | | N | |
| | P, D | P | P | |
| | | | D | rolling back in forward start on uphill |
| | R, N | AT signal | R | |
| | | AT signal | N | |
| | R, D | AT signal | R | |
| | | AT signal | D | |
| | N, D | AT signal | N | |
| | | AT signal | D | |
| no detection | — | AT signal | P | |
| | | AT signal | R | |
| | | AT signal | N | |
| | | AT signal | D | |

Fig.11

CVT vehicle

| detected state | detected signal | HSA determination | actual lever position | problems |
|---|---|---|---|---|
| double detection | P, R | P | P | |
| | | | R | rolling forward in rearward start on downhill |
| | P, N | P | P | |
| | | | N | |
| | P, D | P | P | |
| | | | D | rolling back in forward start on uphill |
| | R, N | R | R | |
| | | | N | maintaining brake on downhill for no purpose |
| | R, D | R | R | |
| | | | D | maintaining brake on downhill for no purpose |
| | | | | rolling back in forward start on uphill |
| | N, D | N | N | |
| | | | D | rolling back in forward start on uphill |
| no detection | — | P | P | |
| | | | R | rolling forward in rearward start on downhill |
| | | | N | |
| | | | D | rolling back in forward start on uphill |

Fig.12
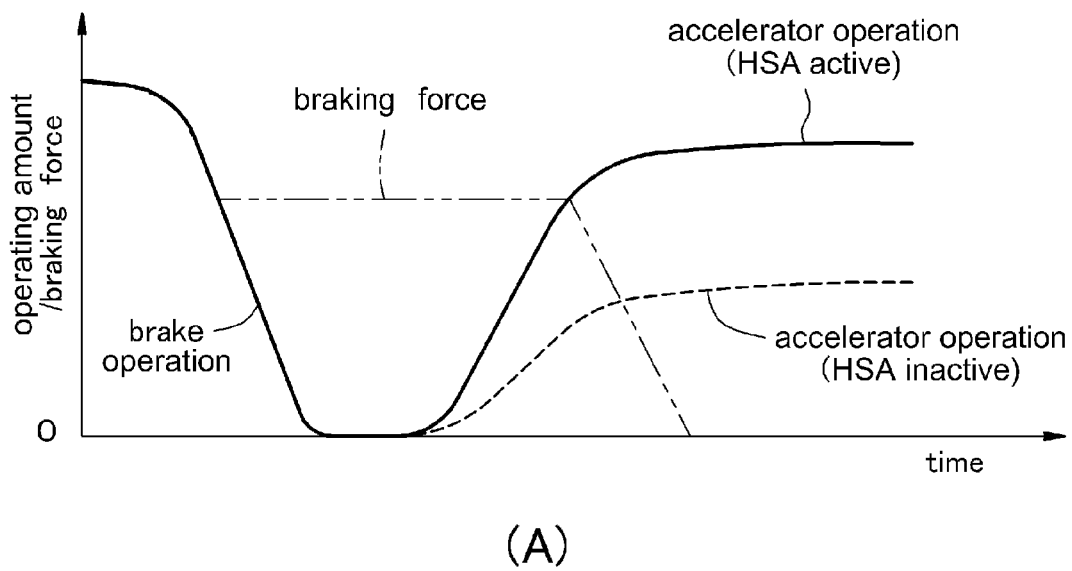
(A)
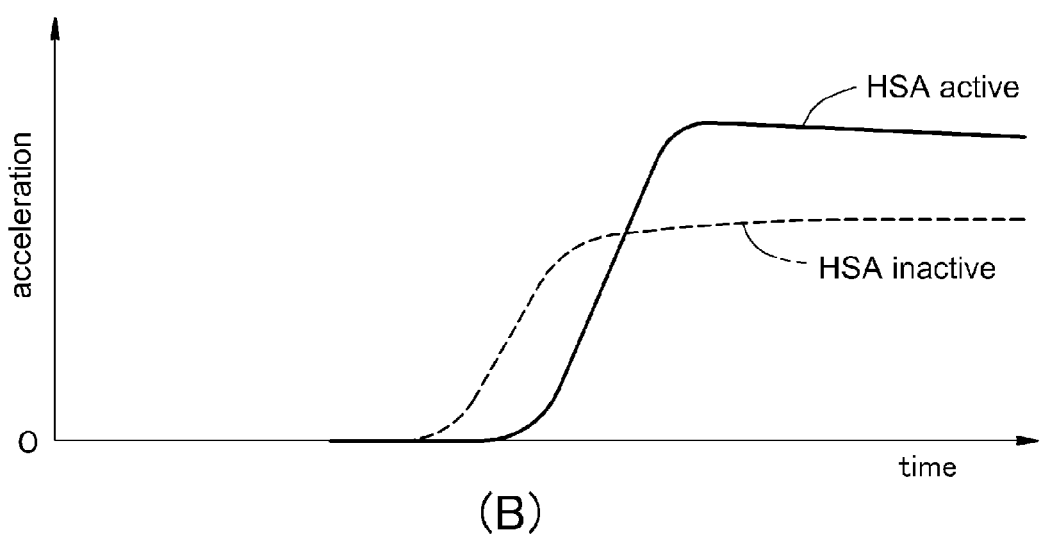
(B)

VEHICLE HILL START ASSIST SYSTEM

TECHNICAL FIELD

The present invention relates to a vehicle hill start assist system that assists a vehicle operator in starting a vehicle on an incline by controlling the brake device of the vehicle depending on the operating condition of the transmission system, and in particular to a technology for preventing the impairment of the handling of the vehicle even when the detected drive direction or the detected drive force of the drive wheels is abnormal.

BACKGROUND OF THE INVENTION

The hill start assist system (HSA) is known as a system for preventing the vehicle from rolling back under its own weight when starting the vehicle on an uphill incline by maintaining the braking force of the vehicle by operating the brake devices of the vehicle when certain conditions are met. See Patent Document 1, for instance.

As illustrated in FIG. 9, the HSA performs it function by being activated (or by maintaining the braking action) when starting forward on an uphill incline or starting rearward on a downhill incline. The inclination of the road surface is typically detected by using a fore and aft G sensor. The intension of the vehicle operator to start forward or rearward can be detected by the shift lever position (in particular, the state of a reverse switch indicating a rearward movement or otherwise) in the case of a manual transmission vehicle (MT vehicle), and the shift lever position determined by the state of shift lever position switches or the selected gear as determined by the control state of the automatic transmission system in the case of an automatic transmission vehicle (AT vehicle). In the case of a belt driven continuous transmission vehicle (CVT vehicle), the intension of the vehicle operator can be detected from the shift lever position as determined by shift lever position switches. When the vehicle starts on an inclined road surface of an inclination angle greater than a prescribed threshold value, the HSA prevents the rolling back of the vehicle by maintaining a brake pressure corresponding to the inclination angle of the road surface.

The shift position is typically determined by the output signals of a number of switches that are turned on and off depending on the presence and absence of the shift lever in the corresponding shift positions. In particular, in the case of an AT or CVT vehicle, a switch is provided in each of a number of shift positions such as reverse (R), neutral (N) and drive (D) positions. Normally, these switches are configured such that any two adjoining switches are not turned on simultaneously.

However, in reality, when the shift lever is positioned intermediate between two different shift positions or any one of the switches has seized in the turned on or turned off state, the two shift positions may be simultaneously detected or no shift position may be detected at times. In such a case, the intention of the vehicle operator (to start forward or rearward) may not be determined To meet such a contingency (when the shift positions are doubly detected or no shift position is detected owing to the failure in the shift position switches), the conventional HSA was incorporated with a control routine as discussed in the following. As illustrated in FIG. 10, in the case of an AT vehicle, when two shift positions are detected at the same time, and one of them consists of the P position, the shift position is determined as the P position. When two shift positions are detected at the same time, and neither of them consists of the P position or when no shift position is detected, the shift position is determined from the gear stage as detected from the control system of the automatic transmission. The lower speed forward shift positions (such as D4, D3, S and L) are omitted from the table in FIG. 10 as they are treated in the same way as the D position. The HSA for CVT vehicles places priorities on the P, R, N and D positions in that order. As illustrated in FIG. 11, when two shift positions are detected at the same time, the one with a higher priority is detected. When no shift position is detected, the P position is detected. The lower speed forward shift positions (such as S and L) are omitted from the table in FIG. 11 as they are treated in the same way as the D position.

PRIOR ART DOCUMENTS

Patent Documents

Patent Document 1: JP 10-044950A

BRIEF SUMMARY OF THE INVENTION

Task to be Accomplished by the Invention

However, in the case of the AT vehicle equipped with the HSA that takes appropriate measures in case of an abnormality in shift position switches as discussed above (See FIG. 10), when both the P and R position signals are detected, and the actual shift position is the R position, the HSA is not activated even when the vehicle is on an downhill incline according to the mode of operation summarized in FIG. 9 that assumes the P position so that the vehicle may roll forward (downward) under its own weight in a rearward start. When both P and D position signals are detected, and the actual shift position is the D position, the HSA is not activated even when the vehicle is on an uphill incline so that the vehicle may roll back (downward) under its own weight in a forward start.

In the case of a CVT vehicle (See FIG. 11), in addition to the problems of the AT vehicle, when both the R and N position signals are detected, and the actual shift position is the N position, the HSA is activated according to the mode of operation summarized in FIG. 9 that assumes the R position so that the brake of the vehicle is maintained for no purpose if the vehicle is on an downhill incline even though the vehicle operator has no intension to start the vehicle. When both the R and D position signals are detected, and the actual shift position is the D position, not only the unnecessary braking action is taken on a downhill incline but also the HSA is not activated even when the vehicle is on an uphill incline so that the vehicle may roll back (downward) under its own weight in a forward start. Furthermore, when both the N and D position signals are detected, and the actual shift position is the D position, the HSA is not activated according to the mode of operation summarized in FIG. 9 that assumes the N position even when the vehicle is on an uphill incline so that the vehicle may roll back (downward) under its own weight in a forward start. When no shift position is detected, the vehicle may roll forward (downward) under its own weight in a rearward start, and may roll back (downward) under its own weight in a forward start.

If the HSA fails to be activated even though the brake is required to be maintained, the vehicle may roll downward on an incline without any warning, and such an unexpected behavior of the vehicle impairs the impression of the vehicle. If the brake is maintained in a forward start on a downhill incline when both the R and D positions are detected, and the actual shift lever position is the D position, the vehicle remains stationary for a certain period of time even after the brake pedal is released as shown in FIG. 12(A), and the vehicle does not start in response to the pressing of the accelerator pedal in a usual manner. Therefore, the vehicle operator tends to operate the accelerator pedal excessively with the result that the vehicle may abruptly start at an acceleration greater than expected as indicated by the solid line in FIG. 12(B), and the handling of the vehicle may be impaired.

The present invention was made in view of such problems of the prior art, and has a primary object to provide a hill start assist system that can prevent the vehicle from behaving in an unexpected manner and improve the impression of the vehicle even when the detected drive direction or the detected drive force of the drive wheels is abnormal.

Means to Accomplish the Task

To achieve such an object of the present invention, a first aspect of the present invention provides a vehicle hill start assist system (1), comprising: a brake device (5) for producing a braking force according to an operation of a brake operating member (2); an inclined road determining unit (23) for determining if a road surface is inclined; a brake control unit (ECU 20) that performs a maintaining control for controlling a reduction in a braking force of the brake device following a release of the brake operating member (2) so as to maintain a stationary state of the vehicle when the inclined road determining unit (23) has detected that the vehicle is kept stationary on an inclined road surface; and an abnormality determining unit (25: detected state determining unit) for determining an abnormality in a detected value on a drive direction of a drive wheel or in a drive force of a drive wheel; wherein the brake control unit (20) comprises a maintaining control unit (26) that causes the maintaining control to maintain the stationary state of the vehicle for a shorter period of time when the abnormality determining unit (25) determines an abnormality than when the abnormality determining unit (25) does not determine an abnormality (T2<T1).

According to this hill start assist system, even when the abnormality determining unit determines an abnormality, and a stationary state of the vehicle may not be maintained in a usual manner even though the situation requires a stationary state of the vehicle is required, because a stationary state of the vehicle is maintained for a time period shorter than the normal prescribed time period upon release of the brake operating member, the behavior of the vehicle is prevented from significantly deviating from the expectation of the vehicle operator. When the abnormality determining unit determines an abnormality, and the hill start assist system causes a stationary state of the vehicle to be produced in spite of no need for such a stationary state, because the stationary state following the release of the brake operating member lasts only for a shorter time period than the normal prescribed time period, the behavior of the vehicle is prevented from significantly deviating from the expectation of the vehicle operator. In particular, even when the vehicle is held stationary upon release of the brake operating member for no purpose, because the stationary state should be canceled before the vehicle operator depresses the accelerator pedal to a significant extent, the vehicle is prevented from abruptly starting at an acceleration significantly greater than the normal level.

According to a second aspect of the present invention, the hill start assist system further comprises a transmission operation detecting unit (14) that detects an operating condition of a transmission, and the abnormality determining unit (25) determines an abnormality when the transmission operation detecting unit (14) detects a plurality of transmission states corresponding to different drive directions simultaneously.

According to this arrangement, the abnormality determining unit is enabled to determine any abnormality in the detection of the traveling direction of the vehicle at the time of a start with ease.

According to a third aspect of the present invention, the hill start assist system further comprises a transmission operation detecting unit (14) that detects an operating condition of a transmission, and the abnormality determining unit (25) determines an abnormality when the transmission operation detecting unit (14) detects a plurality of transmission states corresponding to different drive forces simultaneously.

According to this arrangement, the abnormality determining unit is enabled to determine any abnormality in the detection of the drive force of the vehicle at the time of a start with ease.

According to a fourth aspect of the present invention, the abnormality determining unit (25) detects an abnormality when a drive direction of the drive wheel cannot be determined from an output signal of an engine or a transmission.

According to this arrangement, the abnormality determining unit is enabled to determine any abnormality in the detection of the traveling direction of the vehicle at the time of a start from an output signal of the engine or the transmission with ease.

According to a fifth aspect of the present invention, the abnormality determining unit (25) detects an abnormality when a failure of the drive wheel to produce a prescribed drive force is determined from an output signal of an engine or a transmission.

According to this arrangement, the abnormality determining unit is enabled to determine any abnormality in the detection of the drive force of the vehicle at the time of a start from an output signal of the engine or the transmission with ease.

According to a sixth aspect of the present invention, the vehicle hill start assist system further comprises a transmission operation detecting unit (14) for detecting an operating condition of a transmission; an inclination direction determining unit (14: direction determining unit) for determining an inclining direction of the road surface according to an acceleration (Gx) or speed of the vehicle; and a traveling direction determining unit (28) for determining a traveling direction of the vehicle according to a detection result of the transmission operation detecting unit (14); wherein, when a determination result of the abnormality determining unit is normal, the maintaining control unit (26) determines if it is a case of an uphill start according to determination results of the inclination direction determining unit (24) and traveling direction determining unit (28), and executes the maintaining control only when it is a case of an uphill start. In an uphill start, the vehicle may start forward on an uphill incline, or start backward on a downhill incline.

When the vehicle starts backward on an uphill incline or the vehicle starts forward on a downhill incline, there is little need to assist the vehicle operator in starting the vehicle because the vehicle rolls down by itself in the direction intended by the vehicle operator. In view of this fact, according to this arrangement, the maintaining control is executed only in the case of an uphill start so that the hill start assist is provided only in an uphill start where the vehicle operator expects a hill start assist, and the braking force is not maintained in other situations where there is little need for a hill start assist. Thereby, the handling of the vehicle can be improved.

According to a seventh aspect of the present invention, the maintaining control unit (26) executes the maintaining control without regard to a determination result of the traveling direction determining unit (28) when a determination result of the abnormality determining unit (25) is abnormal.

As discussed above, because the stationary state of the vehicle is maintained for a shorter period of time when the abnormality determining unit determines an abnormality than when the abnormality determining unit does not determine an abnormality, the deviation of the behavior of the vehicle from the expectation of the vehicle operator is insignificant in an abnormal condition without regard to the traveling direction of the vehicle, be it forward or rearward. According to this particular arrangement, by executing the maintaining control when an abnormality is detected without regard to the traveling direction of the vehicle, the hill start assist can be performed in a safe manner even when an abnormal condition is detected without causing the behavior of the vehicle to deviate from the expectation of the vehicle operator in a significant way. In other words, both the convenience of the hill start assist and the safety of the vehicle property can be achieved without any compromise.

According to an eighth aspect of the present invention, the maintaining control unit is configured to perform a constant control that keeps the braking force at a constant level required to keep the vehicle stationary and then a gradual reduction control that progressively reduces the braking force; and an execution time period of the constant control is shorter in a case where a determination result of the abnormality determining unit (25) is abnormal than in a case where a determination result of the abnormality determining unit (25) is normal (t2<t1).

According to this arrangement, supposing that the braking force under the constant control is a minimum braking force that is required to keep the vehicle stationary, by setting the execution time period of the constant control to be shorter in an abnormal condition than in a normal condition so that the maintaining control keeps the vehicle stationary for a shorter period of time in an abnormal condition than in a normal condition, the maintaining control may be performed both easily and reliably. When the braking force under the constant control is substantially greater than the minimum braking force that is required to keep the vehicle stationary, by appropriately selecting the execution time period of the constant control by taking into account the difference between the actual braking force for the constant control and the minimum braking force, and the reduction rate of the braking force for the gradual reduction control, the maintaining control may be performed in such a manner that the vehicle may be kept stationary for a shorter period of time in an abnormal condition than in a normal condition.

According to a ninth aspect of the present invention, a reduction rate of the braking force in the gradual reduction control is lower in a case where a determination result of the abnormality determining unit (25) is abnormal than in a case where a determination result of the abnormality determining unit (25) is normal (k2<k1).

The vehicle rolls down the incline as soon as the brake pedal is released and the braking force falls below the minimum braking force that is required to keep the vehicle stationary. According to this arrangement, because the reduction rate of the braking force in the gradual reduction control is lower in a case where a determination result of the abnormality determining unit is abnormal than in a case where a determination result of the abnormality determining unit is normal, the change in the acceleration of the vehicle when rolling down the incline can be made milder. Also, even when the vehicle operator operates the accelerator pedal excessively in a downhill start (rearward start on an uphill incline or forward start on a downhill incline), the vehicle is prevented from abruptly starting at an acceleration greater than a normal level, and the impairment of the impression of the vehicle can be avoided.

Effect of the Invention

According to the vehicle hill start assist system of the present invention, an unexpected behavior of the vehicle and the impairment of the handling of a vehicle can be avoided even when the detected drive direction or the detected drive force of the drive wheels is abnormal.

BRIEF DESCRIPTION OF THE SEVERAL VIEWS OF DRAWINGS

Now the present invention is described in the following with reference to the appended drawings, in which:

FIG. 3 is a table showing the mode of operation of the hill assist start system;

FIG. 9 is a table showing the basic mode of operation of the conventional hill start assist system;

FIG. 10 is a table showing the mode of operation of a conventional hill start assist system for AT vehicles when an abnormal event is detected;

FIG. 11 is a table showing the mode of operation of a conventional hill start assist system for CVT vehicles when an abnormal event is detected; and FIG. 12 is a diagram showing the problems of the conventional hill start assist system when an abnormal even is detected

DETAILED DESCRIPTION OF THE INVENTION

A hill start assist system 1 embodying the present invention, which is incorporated in an automatic transmission vehicle (vehicle), is described in the following with reference to the appended drawings. In the following description, various components associated with the left and right wheels are denoted with numerals followed by the suffixes 1 and r to indicate which of the wheels the particular components are associated with. For instance, the left and right brake devices are denoted with numerals 5l and 5r, respectively, and the two brake devices may also be each collectively indicated by numeral 5.

Figure 1:
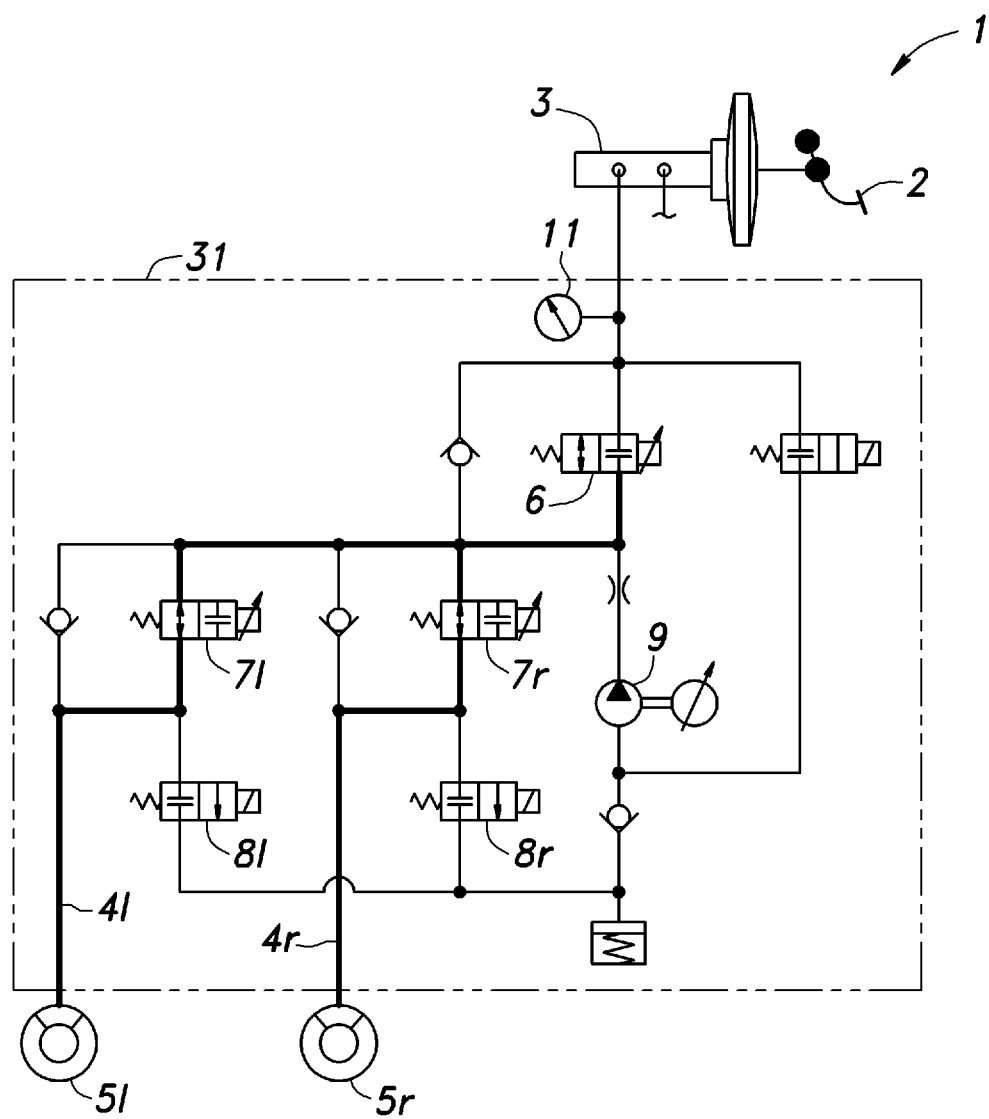
FIG. 1 is a diagram showing the overall structure of a hill start assist system embodying the present invention.

As shown in FIG. 1, the hill start assist system 1 is incorporated in a brake system that comprises a brake pedal 2 serving as a brake operating member, a master cylinder 3 equipped with a booster for amplifying the pressure produced by the depression of the brake pedal 2 and a hydraulic brake device 5 provided in each wheel for generating a braking force corresponding to the operation (depression) of the brake pedal 2 by transmitting the pressure amplified by the master cylinder 3 to the corresponding wheel cylinder via brake fluid piping 4. In this case, the brake device 5 consists of a disk brake device which applies a resistance to the rolling movement of the corresponding wheel by pressing a brake pad actuated by a wheel cylinder against a disk rotor, and produces a braking force of a magnitude in proportion to the brake fluid pressure. The hill start assist system 1 holds the vehicle in a stationary condition even when the brake pedal 2 is released by restricting the reduction in the braking force of the brake device 5. Only the brake devices 5*l* and 5*r* provided on the front wheels are illustrated in FIG. 1 for simplification.

The vehicle of the illustrated embodiment is provided with a VSA (vehicle stability assist) system. The VSA system comprises a regulator valve 6, an inlet valve 7 for each wheel and an outlet valve 8 for each wheel, all consisting of solenoid valves, and a pump 9, and these components are connected to one another by the brake fluid piping 4. A VSA control unit (FIG. 2) 31 is able to control the braking force of each brake device 5 independently from the operation of the brake pedal 2 by controlling these components. The hill start assist system 1 selectively closes the regulator valve 6 of the VSA system to prevent the reduction in the brake fluid pressure in the part of the brake fluid piping 4 indicated by the bold lines in FIG. 1, and thereby prevents the reduction in the braking forces of the brake devices 5.

A master pressure sensor 11 is provided in a part of the brake fluid piping 4 adjacent to the master cylinder 3 to detect the brake fluid pressure amplified by the master cylinder, and the vehicle is incorporated with a fore and aft G sensor 12 for detecting the fore and aft acceleration of the vehicle, a wheel speed sensor 13 for detecting the rotational speed of each wheel, shift position switches 14 provided in the respective positions of the shift lever and configured to be turned on and off depending on if the shift lever is placed in the particular shift position, a throttle opening sensor 15 for detecting an accelerator pedal stroke, a brake switch 16 configured to be turned on and off depending on if the brake pedal is being operated, a parking switch 17 configured to be turned on and off depending on if the parking brake is in operation and an ECU 20 (electronic control unit) for controlling the reduction in the braking force of the brake devices 5 in order to keep the vehicle in the stationary condition, and these components are arranged appropriately in various parts of the vehicle although not shown in the drawings. In the illustrated embodiment, the shift positions of the shift lever include the P, R, N, D, S (second) and L (low) positions.

Figure 2:
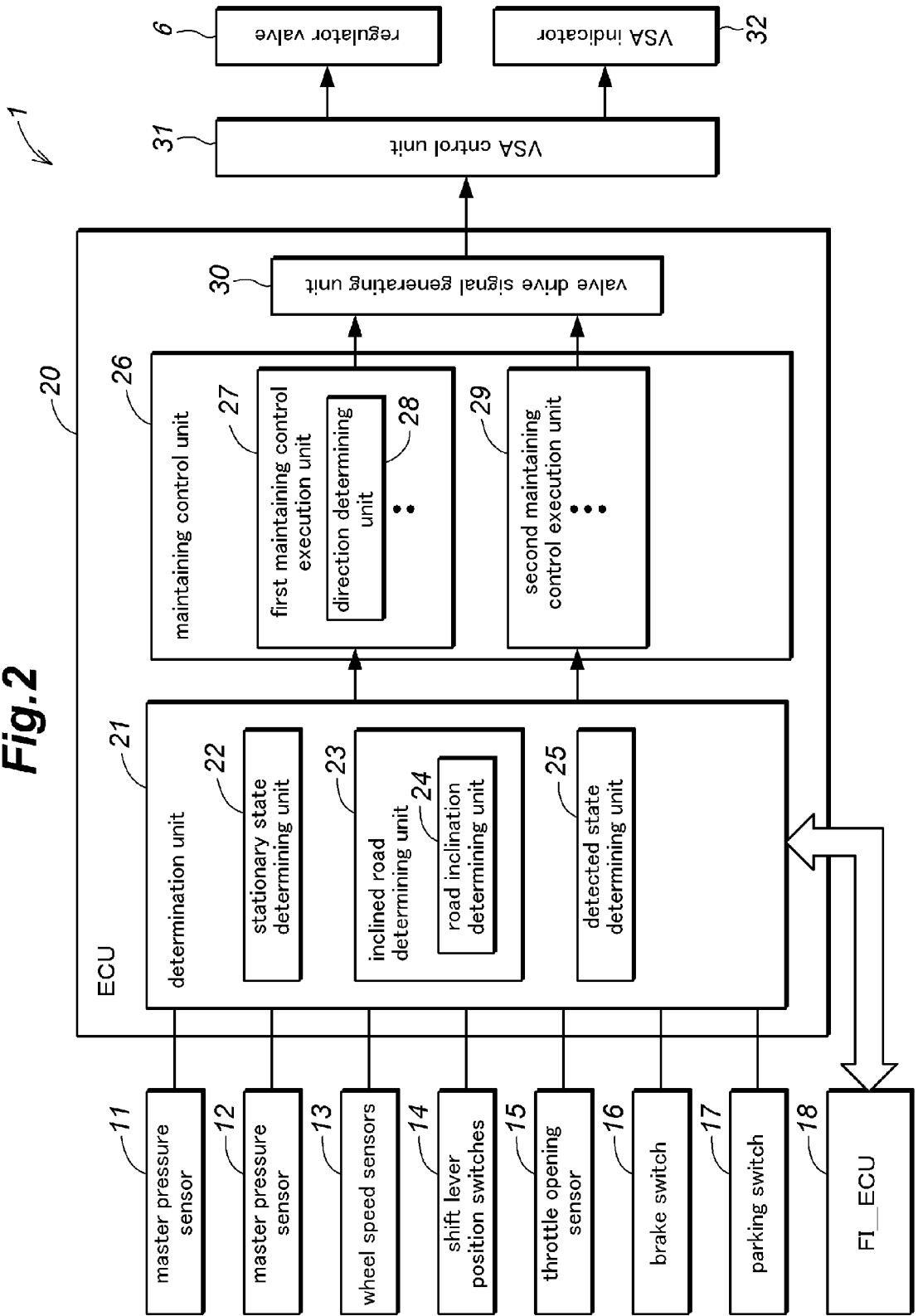
FIG. 2 is a block diagram of the hill assist start system.

The ECU 20 that forms the hill start assist system 1 essentially consists of a CPU, ROM, RAM, a peripheral circuit, an input interface, an output interface and various drivers, and receives the output signals from the various sensors and switches 11 to 17 via the input interface as shown in FIG. 2. The ECU 20 is connected to other control units such as a FI ECU 18 for the transmission control and lock up control of the automatic transmission and the VSA control unit 31 via a vehicle local area network or CAN (controller area network), and these ECUs are configured to monitor the control variables and control states of other ECUs.

The ECU 20 comprises a determination unit 21 that performs various determination processes according to the signals from the various sensors and switches 11 to 17, a maintaining control unit 26 for performing a maintaining control according to the determinations results of the determination unit 21 and a valve drive signal generating unit 30.

The determination unit 21 comprises a stationary state determining unit 22, an inclined road determining unit 23 and a detected state determining unit 25. The stationary state determining unit 22 determines the stationary state of the vehicle from the stability in the fore and aft acceleration detected by the fore and aft G sensor 12 and the detection results of the wheel speed sensors 13. The inclined road determining unit 23 determined if the vehicle is on an incline or not. More specifically, the incline determining unit 23 includes a road inclination determining unit 24 configured to detect the direction of inclination, and is configured to detect both the direction and the angle of the inclination on which the vehicle is located. The detected state determining unit 25 is configured to detect any abnormality in the detection of the drive direction of the drive wheels and the direction of the drive force at the start of the vehicle by determining an abnormal detection state of the shift lever position switches. Only one position signal is produced in a normal detection state, but two position signals may be generated simultaneously or no position signal may be generated in the case of an abnormal detection.

The maintaining control unit 26 comprises a first maintaining control execution unit 27 that performs a maintaining control in a first control mode, and a second maintaining control execution unit 29 that performs a maintaining control in a second control mode. According to the determination results of the stationary state determining unit 22, the inclined road determining unit 23 and the detected state determining unit 25 of the determination unit 21, the maintaining control unit 26 selects the first maintaining control execution unit 27 when the vehicle is stationary on a road surface inclining by more that a prescribed inclination angle and the detection result of the shift position switches 14 is normal, and performs the maintaining control by selecting the second maintaining control execution unit 29 when the vehicle is stationary on a road surface inclining by more that the prescribed inclination angle and the detection result of the shift position switches 14 is abnormal. See FIG. 3.

The first maintaining control execution unit 27 comprises a direction determining unit 28 for detecting the traveling direction of the vehicle according to the input signal from the shift lever position switches 14. A rearward travel is detected by the direction determining unit 28 when the input signal from the shift lever position switches 14 indicates the R position, and a forward travel is detected by the direction determining unit 28 when the input signal from the shift lever position switches 14 indicates the D, S or L position. According to the determination results of the direction determining unit 28 and the road inclination determining unit 24, the maintaining control is performed only in the case of a forward start when the vehicle is stationary on a road surface of an uphill inclination angle greater than the prescribed value (and the brake pedal 2 is released) and in the case of a rearward start when the vehicle is stationary on a road surface of a downhill inclination angle greater than the prescribed value (and the brake pedal 2 is released). See FIG. 3. The details of the maintaining control by the first maintaining control execution unit 27 will be discussed later.

The second maintaining control execution unit 29 is not provided with a means for detecting the traveling direction, and is configured to perform the maintaining control whenever the vehicle is on a road surface of an inclination angle greater than the prescribed value and the brake pedal is released, without determining the traveling direction according to the input signals from the shift lever position switches 14. See FIG. 3. The details of the second maintaining control execution unit 29 will also be discussed later.

The valve drive signal generating unit 30 generates a drive signal for the regulator valve 6 according to the control output of the first maintaining control execution unit 27 or the second maintaining control execution unit 29, and the generated valve drive signal is also forwarded to the VSA control unit 31. Upon receiving the valve drive signal, the VSA control unit 31 controls the reduction in the brake fluid pressure on the side of the brake devices 5 of the brake fluid piping 4. When driving the regulator valve 6, the VSA control unit 31 lights up a VSA indicator 32 on the instrument panel as a warning to the vehicle operator to notify that the VSA system is providing a hill start assisting action.

Figure 4:
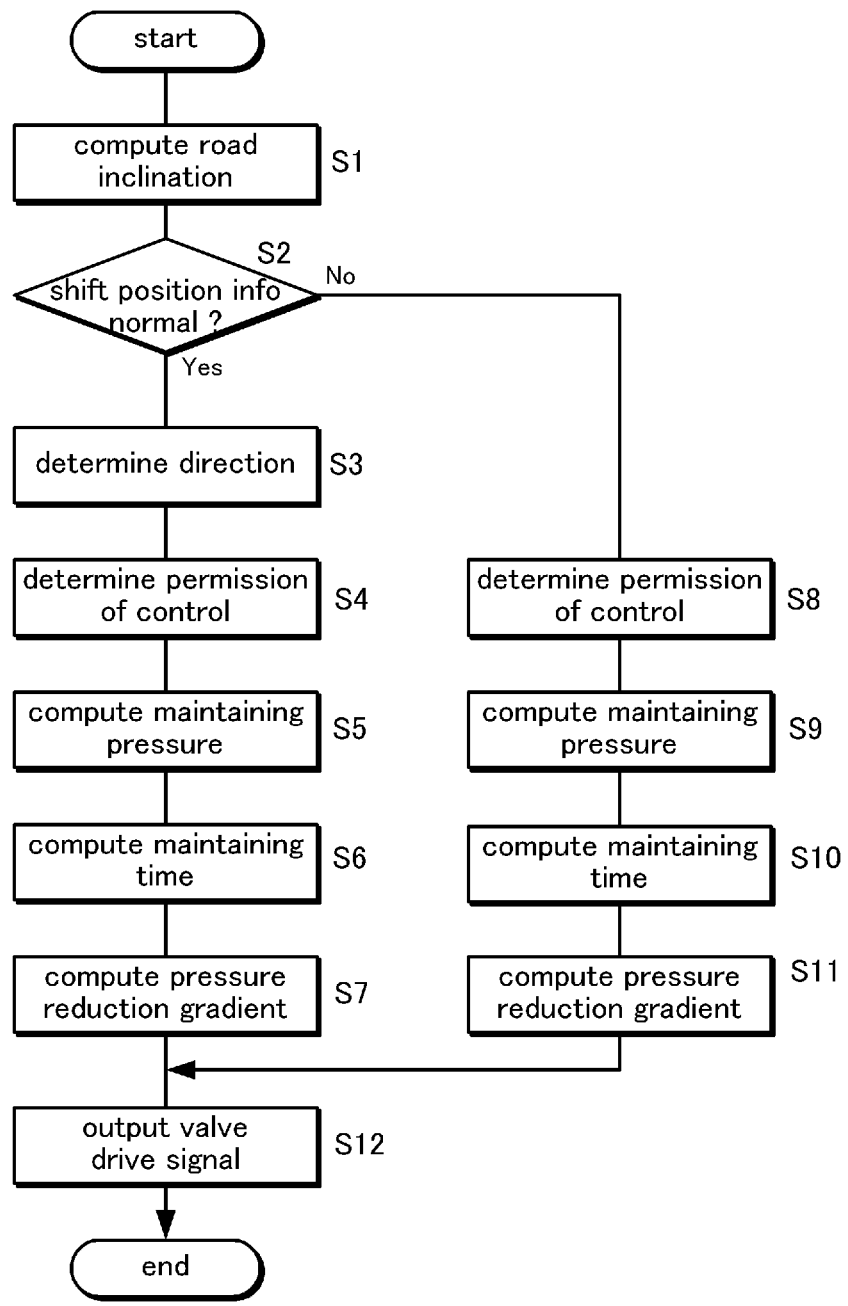
FIG. 4 is a flowchart showing a brake maintaining control of the hill assist start system.

The maintaining control by the hill start assist system 1 is described in the following with reference to the flowchart of FIG. 4. The ECU 20 serving as a brake control means executes the maintaining control as described in the following upon determining that the vehicle is held stationary on a road surface of an inclination angle greater than the prescribed value. First of all, the inclined road determining unit 24 of the ECU 20 computes the inclination angle of the road surface on which the vehicle is held stationary (step S1), and the detected state determining unit 25 determines if the detected state of the shift lever position switches 14 is normal (step S2). If the detected state of the shift lever position switches 14 is normal (Yes), the maintaining control unit 26 selects the first maintaining control execution unit 27, and performs step S3 and the subsequent steps. If the detected state of the shift lever position switches 14 is abnormal (No), the maintaining control unit 26 selects the second maintaining control execution unit 29, and performs step S8 and the subsequent steps.

When the determination result of step S2 is Yes, the direction determining unit 28 of the first maintaining control execution unit 27 determines the traveling direction of the vehicle (step S3). Then, the first maintaining control execution unit 27 determines if the maintaining control is to be permitted according to the detected traveling direction and the inclination direction (step S4). In step S4, the maintaining control is permitted in the case of a rearward start (R position) on a downhill incline and in the case of a forward start (D, S or L position) on an uphill incline, and is not permitted otherwise, similarly as in the prior art illustrated in FIG. 9. The first maintaining control execution unit 27 further computes the maintaining fluid brake pressure in the brake devices 5 when performing the maintaining control (step S5), computes the maintaining time period of the brake fluid pressure (step S6) and computes the gradient of the brake fluid pressure reduction (step S7), and the ECU 20 forwards a corresponding drive signal to the regulator valve 6 via the valve drive signal generating unit 30 (step S12).

Figure 5:
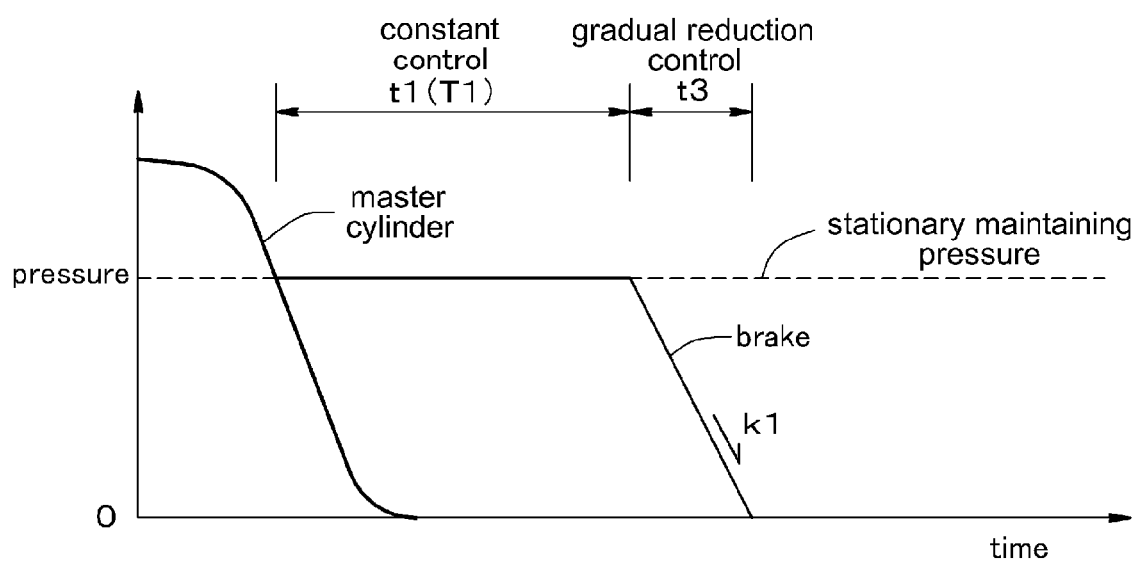
FIG. 5 is a graph showing a time history of a brake pressure maintaining action by a first maintaining control execution unit.

More specifically, the computation processes in step S5, S6 and S7 are performed as described in the following such that the brake fluid pressure changes as shown in FIG. 5. The maintaining pressure of the brake fluid is computed as a minimum pressure that is required to keep the vehicle stationary on the incline depending on the inclination angle thereof, and the maintaining time period of the brake fluid pressure is computed as a constant control execution time period t1 during which the brake fluid pressure is to be kept constant at the maintaining pressure according to the inclination angle of the road surface and the characteristics of the vehicle operator. Therefore, in the present embodiment, the control execution time period t1 is equal to a first stationary state maintaining time period T1 (first prescribed time period) during which the vehicle is kept stationary. The gradient of the brake fluid pressure reduction is computed as a pressure reduction rate k1 according to the inclination angle of the road surface. Therefore, the quotient obtained by dividing the maintaining pressure by the pressure reduction rate k1 is given as a reduction control execution time period t3 in which the brake fluid pressure is progressively reduced from the maintaining pressure under the constant control to zero. As will be described hereinafter in connection with a modified embodiment, the maintaining pressure of the brake fluid may be selected so as to be substantially greater than the minimum pressure that is required to keep the vehicle stationary. The control execution time period t1 for the constant control may also be given as a predetermined value.

If the determination result of step S2 is No, the second maintaining control execution unit 29 makes a control permission determination without performing a traveling direction determination process for the vehicle (step S8). In the present embodiment, a control permission is given in any case. Alternatively, a control permission determination may be made only in the case of the detected states shown in FIG. 3, and a maintaining control similar to that of the first maintaining control execution unit 27 may be executed in other cases of the detected states such as when the D and S positions, D and L position or any other two forward shift positions are detected at the same time.

Thereafter, the second maintaining control execution unit 29 computes the maintaining pressure of the brake fluid for the brake device 5 for the maintaining control (step 9), computes the maintaining time period of the brake fluid pressure (step S10) and computes the gradient of the brake fluid pressure reduction (step S11), and the ECU 20 forwards a corresponding drive signal to the regulator valve 6 via the valve drive signal generating unit 30 (step S12).

Figure 6:
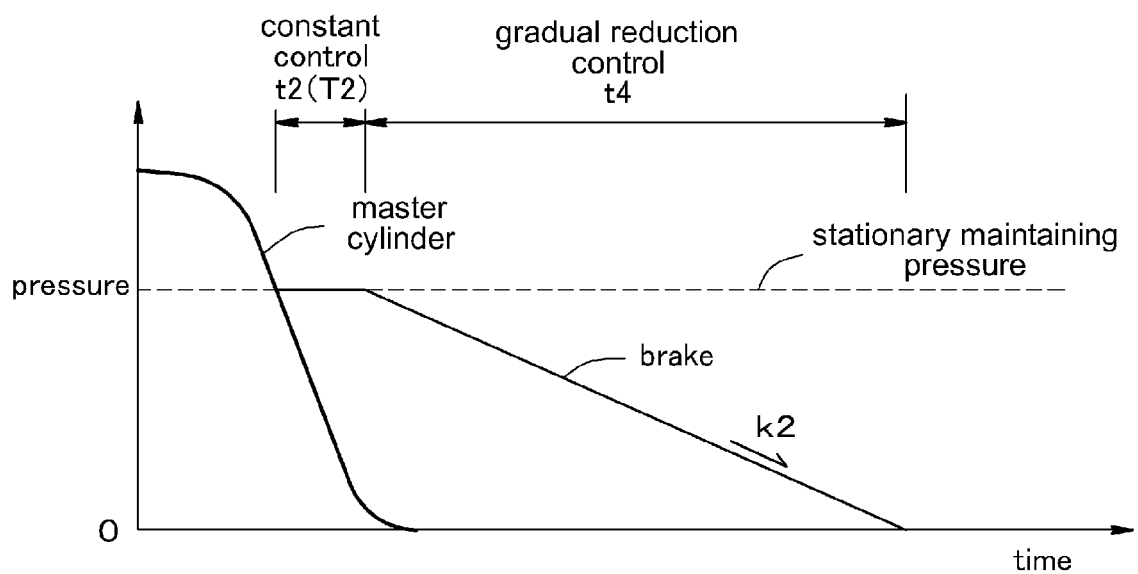
FIG. 6 is a graph showing a time history of a brake pressure maintaining action by a second maintaining control execution unit.

The computations in steps S9, S10 and S11 are executed as described in the following, and the brake fluid pressure changes as shown in FIG. 6. More specifically, the maintaining pressure of the brake fluid is computed as a stationary maintaining pressure that is required to keep the vehicle stationary on the road surface of the given inclination angle similarly as in step S5, and the maintaining time period of the brake fluid pressure is computed as a control execution time period t2 for the constant control which is based on the given inclination angle of the road surface and the characteristics of the vehicle operator similarly as in step S6. The control execution time period t2 in this case is shorter than the control execution time period t1 for the first maintaining control execution unit 27. Therefore, the second stationary maintaining time period T2 (second prescribed time period which is the same as the control execution time period t2 for the constant control) during which the vehicle is kept stationary is shorter than the first stationary maintaining time period T1. The depressurization gradient in the gradual reduction control is computed as the reducing rate of the braking force k2 in step S11 similarly as in step S7, and is smaller (a lower reduction speed) than the reducing rate of the braking force k1 by the first maintaining control execution unit 27. Therefore, the control execution time period t4 of the gradual reduction control given as a quotient obtained by dividing the stationary maintaining pressure by the reducing rate of the braking force k2 is longer than the reduction control execution time period t3 of the first maintaining control execution unit 27.

As discussed above, the maintaining control unit 26 is provided with the first maintaining control execution unit 27 and the second maintaining control execution unit 29, and selects the second maintaining control execution unit 29 (steps S8 to S11) according to the detected state of the shift lever position switches 14 (step S2) such that the stationary state is maintained for the first stationary maintaining time period T1 which is longer than the second stationary maintaining time period T2 upon releasing the brake pedal 2 when a hill start assist is definitely required, and the stationary state is maintained for the second stationary maintaining time period T2 which is shorter than the first stationary maintaining time period T1 upon releasing the brake pedal 2 when a hill start assist may or may not be required. Thereby, the vehicle is allowed to behave in a manner which does not excessively deviates from the expectation of the vehicle operator.

Because the second maintaining control execution unit 29 executes the maintaining control without regard to the traveling direction of the vehicle, the vehicle is allowed to behave in a manner which does not excessively deviates from the expectation of the vehicle operator, and a safe start assist can be provided even in case of a failure in the shift lever position switches 14. Thereby, both an effective maintaining control and a safe vehicle property may be achieved without any compromise. As the maintaining control includes the constant control and the gradual reduction control, and the maintaining pressure at the time of the maintaining control is selected at the minimum pressure level that is required to keep the vehicle stationary, the control execution time period t1, t2 is made to agree with the timer period T1, T2 of keeping the vehicle stationary, and the second stationary maintaining time period T2 by the second maintaining control execution unit 29 can be made shorter than the first stationary maintaining time period by the first maintaining control execution unit 27 both easily and reliably.

The reducing rate of the braking force k2 by the second maintaining control execution unit 29 is lower than the reducing rate of the braking force k1 by the first maintaining control execution unit 27 so that the downhill acceleration in the hill start can be made mild. Furthermore, even when the vehicle operator operates the accelerator pedal excessively while the vehicle remains stationary during a downhill start assist operation, the vehicle is prevented from abruptly starting at a high acceleration, and the impairment of the handling of the vehicle can be avoided.

Modified Embodiment

Figure 7:
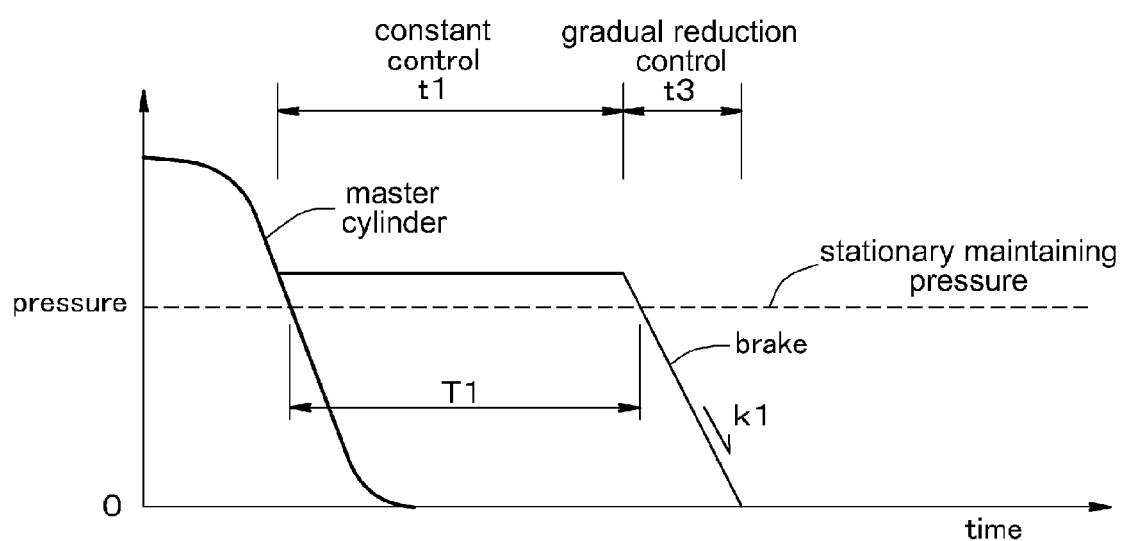
FIG. 7 is a graph showing a time history of a brake pressure maintaining action by a first maintaining control execution unit according to a modified embodiment of the present invention.
Figure 8:
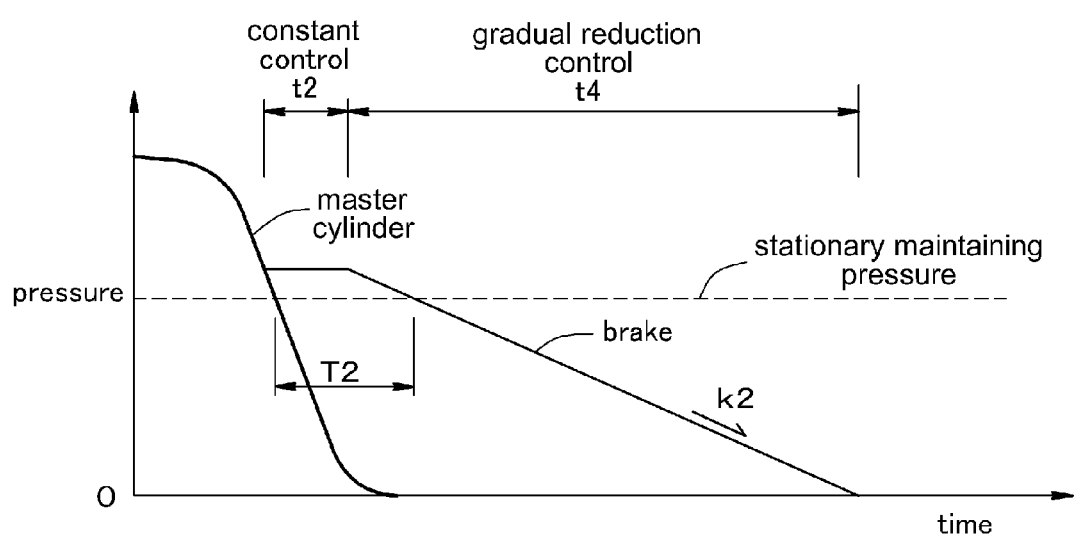
FIG. 8 is a graph showing a time history of brake pressure maintaining action by a second maintaining control execution unit according to the modified embodiment of the present invention.

A modified embodiment of the present invention is described in the following with reference to FIGS. 7 and 8. In this embodiment, the maintaining pressure of the brake fluid by the first maintaining control execution unit 27 and by the second maintaining control execution unit 29 in steps S5 and S9, respectively, are selected to be substantially greater than the minimum pressure that is required to keep the vehicle stationary. Therefore, the execution time period t1 for the constant control by the first maintaining control execution unit 27 and the execution time period t2 for the constant control by the second maintaining control execution unit 29 differ from the first stationary maintaining time period (first prescribed time period) T1 by the first maintaining control execution unit 27 and the second stationary maintaining time period (second prescribed time period) T2 by the second maintaining control execution unit 29, respectively. In this case, the control execution time periods t1 and t2 are computed in such a manner that the time periods T1 and T2 for keeping the vehicle stationary are selected as prescribed values according to the difference between the maintaining pressure under the constant control and the vehicle stationary maintaining pressure, and the depressurization gradients in the gradual reduction control k1 and k2. By selecting the maintaining pressure of the brake fluid to be substantially greater than the vehicle stationary maintaining pressure, the vehicle may be kept stationary under the constant control in a reliable manner even if there is an error in the detection of the inclination of the road surface by the fore and aft G sensor 12, if the vehicle weight is greater than usual, or if the rolling resistance is reduced owing to the road surface condition and the tire condition.

Although the present invention has been described in terms of a preferred embodiment thereof, it is obvious to a person skilled in the art that various alterations and modifications are possible without departing from the scope of the present invention. For instance, the arrangements for detecting the operating state of the transmission discussed above are merely exemplary, and other arrangements may also be used in step S2 of the foregoing embodiment for detecting any abnormality in the detected values of the drive direction of the drive wheels or the magnitude of the drive force of the drive wheels. Such arrangement may include those for detecting abnormality such as a case where the traveling direction intended by the vehicle operator cannot be determined because a plurality of drive directions are detected from the output signal of the power source such as an electric motor and an internal combustion engine, the output signal of the transmission or the information on the wheel speed, and a case where the drive force delivered by the power source directly or via a transmission is smaller than normal owing to a drop in the electric power supply to the electric motor, a failure of a part of the cylinders of the internal combustion engine, or a failure of the fluid coupling of the automatic transmission. The hill start assist system 1 according to the present invention was applied to an AT vehicle equipped with a VSA system in the foregoing embodiment, but may also be applied to vehicles not equipped with a VSA system, and other forms of vehicles such as CVT vehicles, MT vehicles, electric vehicles using an electric motor as a power source and hybrid vehicles as can be readily appreciated by a person skilled in the art. The maintaining pressure of the brake fluid was kept constant at a value required to keep the vehicle stationary in the foregoing embodiment, but may also be held at the maximum pressure produced by the depressing of the brake pedal 2, or may be gradually reduced from the start of the maintaining control according to the computed stationary maintaining pressure and the selected stationary maintaining time period T1, T2 without performing any constant control. Furthermore, the reduction rate of the brake fluid pressure in the gradual reduction control can be varied during the control process. The specific structures of the various devices and the control methods in the foregoing embodiment may be appropriately modified without departing from the spirit of the present invention.

GLOSSARY 1 hill start assist system
2 brake pedal (brake operating member)
5 brake device
14 shift lever position switch (transmission operation detecting unit)
20 ECU (brake control unit)
23 inclined road determining unit
24 road inclination determining unit (inclination direction determining unit)
25 detected state determining unit (abnormality determining unit)
26 maintaining control unit
27 first maintaining control execution unit
28 traveling direction determining unit
29 second maintaining control execution unit
T1 first stationary maintaining time period (first prescribed time period)

T2 second stationary maintaining time period (second prescribed time period)
t1, t2 control execution time period
k1, k2 depressurization gradient in the gradual reduction control
(reducing rate of the braking force)

The invention claimed is:

1. A vehicle hill start assist system, comprising:
   a brake device for producing a braking force according to an operation of a brake operating member;
   an inclined road determining unit for determining if a road surface is inclined;
   a brake control unit that performs a maintaining control for controlling a reduction in a braking force of the brake device following a release of the brake operating member so as to maintain a stationary state of the vehicle when the inclined road determining unit has detected that the vehicle is kept stationary on an inclined road surface; and
   an abnormality determining unit for determining an abnormality in a detected value on a drive direction of a drive wheel or in a drive force of a drive wheel;
   wherein the brake control unit comprises a maintaining control unit that causes the maintaining control to maintain the stationary state of the vehicle for a shorter period of time when the abnormality determining unit determines an abnormality than when the abnormality determining unit does not determine an abnormality.

2. The vehicle hill start assist system according to claim 1, further comprising a transmission operation detecting unit that detects an operating condition of a transmission, wherein the abnormality determining unit determines an abnormality when the transmission operation detecting unit detects a plurality of transmission states corresponding to different drive directions simultaneously.

3. The vehicle hill start assist system according to claim 1, further comprising a transmission operation detecting unit that detects an operating condition of a transmission, wherein the abnormality determining unit determines an abnormality when the transmission operation detecting unit detects a plurality of transmission states corresponding to different drive forces simultaneously.

4. The vehicle hill start assist system according to claim 1, wherein the abnormality determining unit detects an abnormality when a drive direction of the drive wheel cannot be determined from an output signal of an engine or a transmission.

5. The vehicle hill start assist system according to claim 1, wherein the abnormality determining unit detects an abnormality when a failure of the drive wheel to produce a prescribed drive force is determined from an output signal of an engine or a transmission.

6. The vehicle hill start assist system according to claim 1, further comprising:
   a transmission operation detecting unit for detecting an operating condition of a transmission;
   an inclination direction determining unit for determining an inclining direction of the road surface according to an acceleration or speed of the vehicle; and
   a traveling direction determining unit for determining a traveling direction of the vehicle according to a detection result of the transmission operation detecting unit;
   wherein, when a determination result of the abnormality determining unit is normal, the maintaining control unit determines if it is a case of an uphill start according to determination results of the inclination direction determining unit and traveling direction determining unit, and executes the maintaining control only when it is a case of an uphill start.

7. The vehicle hill start assist system according to claim 6, wherein the maintaining control unit executes the maintaining control without regard to a determination result of the traveling direction determining unit when a determination result of the abnormality determining unit is abnormal.

8. The vehicle hill start assist system according to claim 1, wherein the maintaining control unit is configured to perform a constant control that keeps the braking force at a constant level required to keep the vehicle stationary and then a gradual reduction control that progressively reduces the braking force; and
   an execution time period of the constant control is shorter in a case where a determination result of the abnormality determining unit is abnormal than in a case where a determination result of the abnormality determining unit is normal.

9. The vehicle hill start assist system according to claim 8, wherein a reduction rate of the braking force in the gradual reduction control is lower in a case where a determination result of the abnormality determining unit is abnormal than in a case where a determination result of the abnormality determining unit is normal.

* * * * *